(12) United States Patent
Nevoret et al.

(10) Patent No.: US 6,599,177 B2
(45) Date of Patent: Jul. 29, 2003

(54) COATED ABRASIVES WITH INDICIA

(75) Inventors: Damien Cyrille Nevoret, Amherst, NY (US); Gwo Shin Swei, East Amherst, NY (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 3 days.

(21) Appl. No.: 09/891,012

(22) Filed: Jun. 25, 2001

(65) Prior Publication Data

US 2002/0197945 A1 Dec. 26, 2002

(51) Int. Cl.[7] .................................................. B24D 3/00
(52) U.S. Cl. ...................... 451/526; 451/539; 451/527
(58) Field of Search ................................ 451/526, 527, 451/528, 529, 534, 537, 539; 51/293

(56) References Cited

U.S. PATENT DOCUMENTS

| | | | | |
|---|---|---|---|---|
| 4,911,734 A | * | 3/1990 | Short ............................. | 8/471 |
| 5,137,542 A | * | 8/1992 | Buchanan et al. ............. | 51/295 |
| 5,514,028 A | * | 5/1996 | Ali et al. ....................... | 451/539 |
| 5,910,471 A | * | 6/1999 | Christianson et al. .......... | 51/295 |
| 6,062,967 A | * | 5/2000 | Calafut et al. .............. | 451/523 |
| 6,145,512 A | * | 11/2000 | Daley .......................... | 451/539 |
| 6,213,856 B1 | * | 4/2001 | Cho et al. ..................... | 451/56 |
| 6,287,184 B1 | * | 9/2001 | Carpentier et al. ......... | 451/526 |

FOREIGN PATENT DOCUMENTS

WO    WO 01/24971    12/2001

* cited by examiner

Primary Examiner—Robert A. Rose
(74) Attorney, Agent, or Firm—Joseph P. Sullivan

(57) ABSTRACT

A coated abrasive having an abrasive surface comprising a plurality of individual abrasive structures can be modified to convey information by changing the appearance, for example by changing the size, shape or spacing of the structures to create patterns conveying the information.

3 Claims, 1 Drawing Sheet

COATED ABRASIVES WITH INDICIA

BACKGROUND OF THE INVENTION

Figure 1:
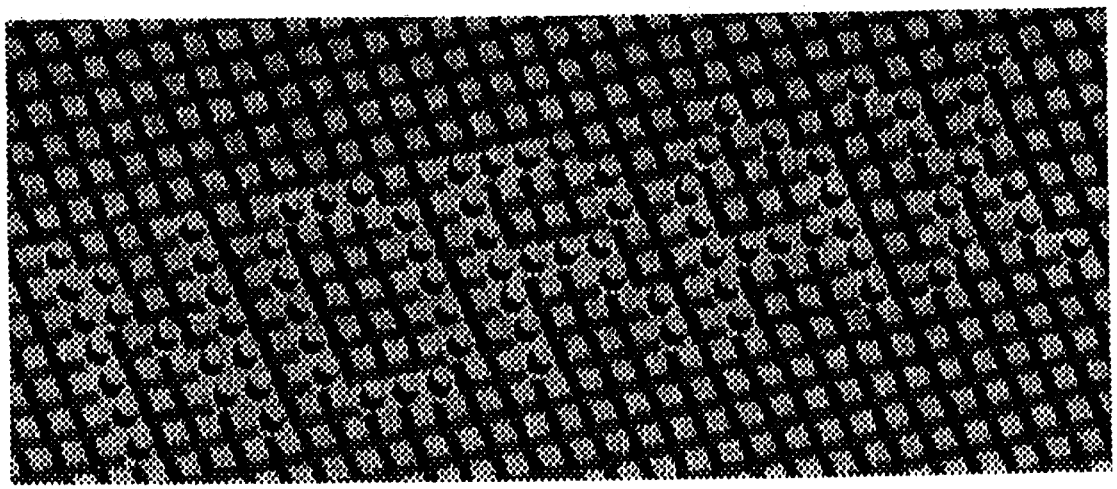

This invention relates to coated abrasives and more particularly to coated abrasives in which the abrasive surface comprises a plurality of generally regular composite structures each of which comprises abrasive grain dispersed within a cured binder. The shape, spacing, size and composition of the composites can be manipulated to achieve a wide range of abrasive properties and for this reason the products are frequently referred to as "engineered abrasives" and this convention is adopted herein.

Engineered abrasives share a drawback, or more accurately an inconvenience, with all coated abrasives. Once they have been placed in position on a backup pad in the case of an abrasive disc, or on a machine in the case of a belt, it is difficult to identify the nature or source of the product being used without taking the abrasive off the device to which it is attached.

Various options have been identified to overcome this problem. These include most notably the use of different colors to indicate different grit sizes or types of surface treatment. This technique has been used commercially with some success but the approach depends on the operator knowing the "code" used by the manufacturer. With the advent of engineered abrasives a further technique becomes available for communicating information to the user in a convenient and very direct manner and this approach is at the heart of the present invention.

GENERAL DESCRIPTION OF THE INVENTION

The present invention provides an engineered abrasive having an abrasive surface comprising a plurality of shaped abrasive structures wherein the structures are modified to create visible product indicia on the surface.

In the context of this invention the term "indicia" is intended to convey any information, corporate name, trademark, or other product identifier appropriate to the coated abrasive bearing the indicia.

The modification can be for example in the form of structures of a different size, shape or spacing or a combination of these characteristics. It would also be considered a "modification" to eliminate individual structures altogether to create a pattern on the surface corresponding to the desired indicia. The most convenient modification is to change the shape of the structure. For example, if the structures on the surface are all square-based pyramids, the shapes within the space occupied by the indicia could be conical. If the surface comprises structures of identical size, (in terms of the distance of the distal end from the backing), and the indicia are not used extensively, the structures could additionally or alternatively be made uniformly smaller, (that is, with the distal ends closer to the backing), within the space occupied by the indicia. It would also be effective to connect adjacent structures by ridges so as to spell out letters or numbers. This can be particularly effective when the tool is an abrasive belt and the pattern on the surface is one of parallel ridges running across the width of the belt at an acute angle to the sides of the belt. A further variant would be to create grooves in the surface of selected structures such that the grooves spelled out the desired indicia. This technique can also be used to indicate the end of the useful life of the coated abrasive such that the product is deemed worn out when the grooves by which the indicia are created, are no longer visible The indicia used are not restricted other than by law and good taste. It can for example be the name of the manufacturer, the trademark associated with the product and/or the grit size. If the amount of information conveyed in this way is too extensive and the extent of modifications required results in local disruption of the grinding patterns, then the overall drop in performance of the product would make the option unattractive. However if the performance effect is insignificant and the value of the information conveyed important, this technique offers a very valuable convenience to the user and an excellent means of differentiating the products of one manufacturer from those of another.

DETAILED DESCRIPTION OF THE INVENTION

The feasibility of the present invention is in part determined by the technique used to form the structures comprising the abrasive surface of the engineered abrasive. Where these are made by the use of a tool that actually shapes the structures while they are being cured, or whether they are created by an embossing tool, the manner of making the tool itself become critical. For example the use of a tool in which the shapes are created by knurling lines on the surface of the tool, (as described for example in U.S. Pat. Nos. 5,152,917; 5,454,844; 5,489,235; 5,658,184; 5,672,097; 5,681,217; 5,833,724; 5,840,088; and 5,863,306), would make it very difficult or even impossible to create indicia by the process of the invention. However newer techniques have been developed which allow for a much more flexible approach. These include various "rapid prototyping" techniques in which a computer is used to generate a precise surface design and the design is replicated in the form of a tool by a rapid prototyping machine. There are several techniques for rapid prototyping and most of them describe ways in which the computer creates the design, resolves it into a series of horizontal slices and then causes formation of the individual slices, each successive one on top of the previous slice, until the complete structure designed in the computer has been replicated in three dimensions. The most frequently encountered pattern-building techniques are stereolithography, (in which a pattern is built layer by layer from a bath of a UV-curable resin and cure is initiated within each successive layer using a laser beam sweeping a pattern corresponding to the dimensions of the desired layer); ink-jet deposition, (in which a molten thermoplastic resin is deposited in layers to create the desired pattern using a modified ink-jet deposition technique); and fused deposition machining, (in which a thermoplastic filament is heated to a semi-liquid state, extruded and deposited in thin layers from which the desired pattern is constructed).

The three-dimensional pattern thus created becomes the tool used to generate male or female copies in a material suitable for creating the corresponding engineered abrasive surface structure. A technique for performing this operation is described for example in U.S. application Ser. No. 09/564,092 filed May 3, 2000 which is incorporated herein by reference.

The modifications made can, as indicated above be through elimination of structures and this can change the grinding characteristics. This can be negative in that, in the vicinity of the indicia there are fewer grinding points. However the impact could in some circumstances be positive since, (assuming grinding is being continued under constant grinding conditions), in the area of the indicia, the grinding pressure is higher since the pressure is brought to bear on a smaller number of grinding points and more work-piece material will be ground at each. In addition of course there will be wider avenues for dispersal of the swarf.

The material from which the individual structures are made comprises abrasive particles dispersed within a matrix of a cured resin. The abrasive particles can be any of those commonly used for this purpose including alumina, (fused or ceramic), alumina/zirconia, silicon carbide, cubic boron nitride, diamond and mixtures thereof. In some cases very mild abrasives such as gamma alumina, boehmite, silica or ceria can be used alone or in admixture with one or more other abrasives. The nature of the binder is not critical but generally radiation-curable resins are preferred. Other components can be present in the abrasive/binder mixture including flow-enhancing additives, plasticizers, grinding aids, adhesion control additives, fillers and the like. The structures can be given a surface coating comprising for example grinding aids, anti-loading additives, further abrasive particles adhered to the top surface and anti-static additives.

Many different types of engineered abrasive surface have been designed to fit the product for a specific part of the market. Essentially all however are adaptable to the present invention and it is intended to cover all in the general application of the principles of this invention.

DRAWING

FIG. 1 is a computer-generated design in which the engineered abrasive surface comprises square block structures. The trademark NORAX® has been created on the surface by changing selected blocks to cylinders in a pattern to correspond to the trademark. This is intended only as a simple illustration of the capabilities of the invention.

What is claimed is:

1. An engineered abrasive having a surface comprising a plurality of identical first shaped abrasive structures in which second abrasive structures are formed simultaneously with and dispersed among the first abrasive structures with different features such that the second abrasive structures spell out visible product indicia on the surface wherein adjacent second abrasive structures are formed with a connecting ridge.

2. An engineered abrasive according to claim 1, wherein the second abrasive structures differ from the plurality of first abrasive structures by being formed with differences in features selected from the group consisting of shape, size and combinations thereof.

3. An engineered abrasive according to claim 1, wherein the visible product indicia are selected from the group consisting of manufacturer identification, trademark, slogan, nature of abrasive grit, size of abrasive grit, surface treatment and combinations thereof.

* * * * *